Mar. 3, 1925.  
G. W. SWIFT, JR  
CLUTCH  
Filed March 6, 1924

WITNESSES  
Oliver W. Holmes

INVENTOR  
George W. Swift, Jr.  
BY  
Knight Bro  
ATTORNEYS

Mar. 3, 1925.
G. W. SWIFT, JR
1,528,637
CLUTCH
Filed March 6, 1924
3 Sheets-Sheet 2
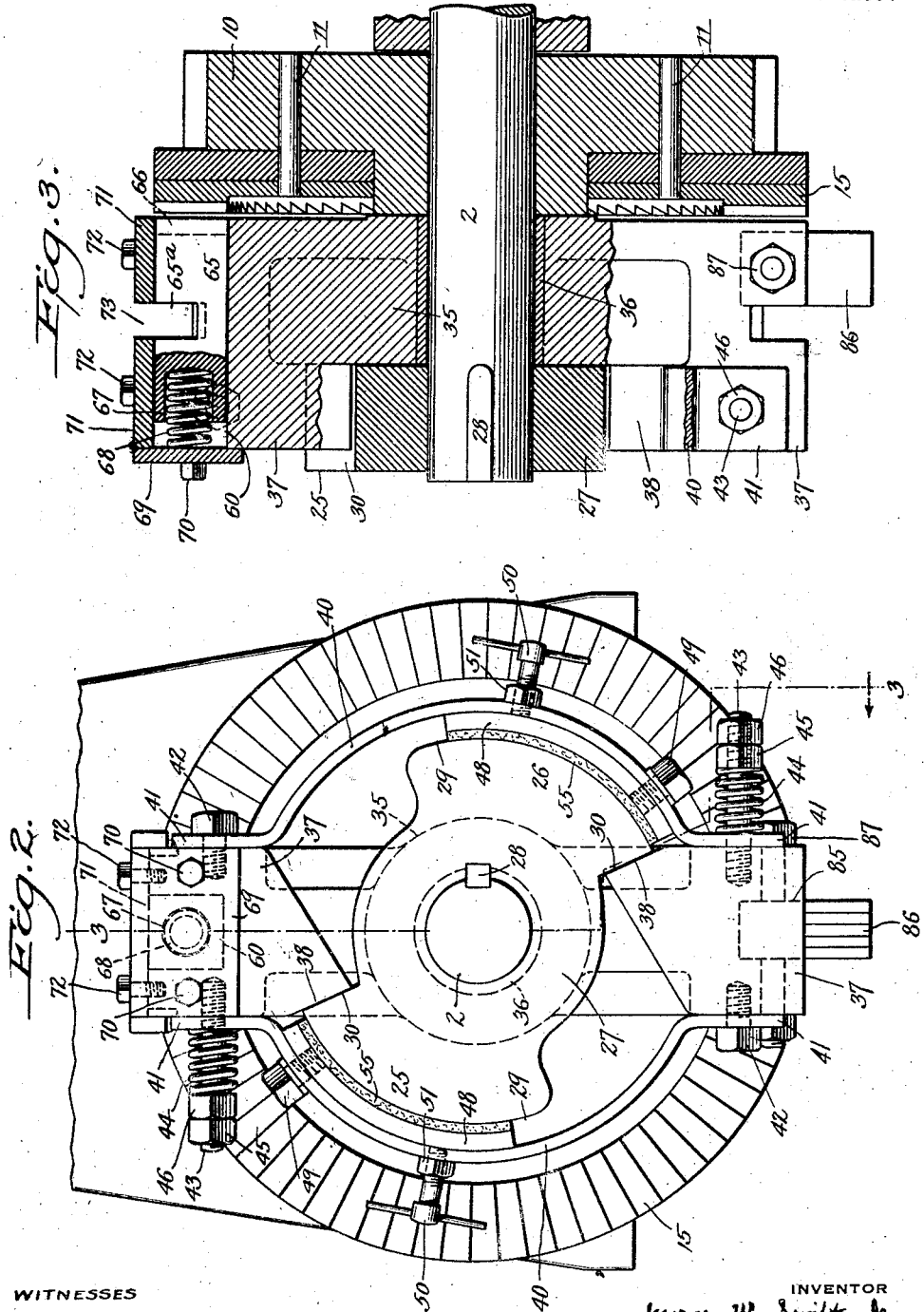
WITNESSES
Oliver W. Holmes
INVENTOR
George W. Swift, Jr.
BY
Knight Bro.
ATTORNEYS Mar. 3, 1925.
G. W. SWIFT, JR
CLUTCH
Filed March 6, 1924
1,528,637
3 Sheets-Sheet 3
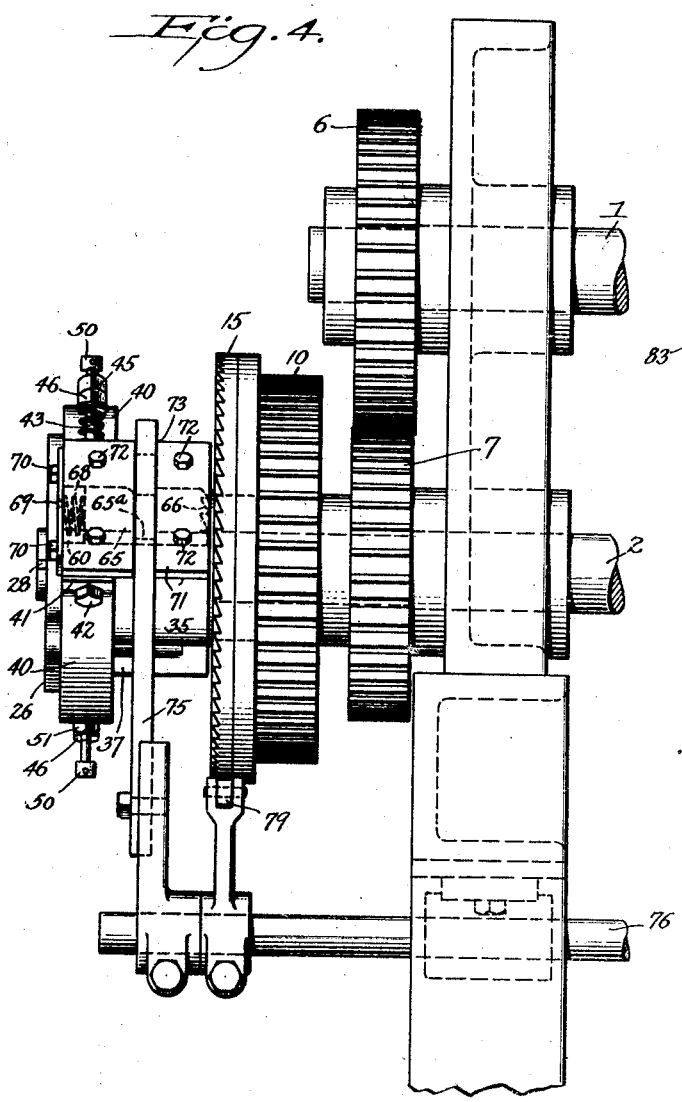

Patented Mar. 3, 1925.

1,528,637

UNITED STATES PATENT OFFICE.

GEORGE W. SWIFT, JR., OF BORDENTOWN, NEW JERSEY.

CLUTCH.

Application filed March 6, 1924. Serial No. 697,239.

*To all whom it may concern:*

Be it known that I, GEORGE W. SWIFT, Jr., a citizen of the United States, and resident of Bordentown, county of Burlington, and State of New Jersey, have invented certain new and useful Improvements in Clutches, of which the following is a specification.

The present invention relates to improvements in clutches particularly designed for the control of periodically operating mechanisms in which the controlled mechanism is thrown into action for performing its work and is automatically thrown out of action at the completion of the work. Such clutches are usually applied to mechanisms including a rotary driven shaft which completes a desired operation in one revolution, such for instance as the cooperating cutter rolls for severing desired lengths from a web. A mechanism of this type is illustrated in U. S. Patent No. 1,343,487, granted to me June 15th, 1920, and for the purpose of illustration my present invention is shown applied to the variable automatic control mechanism set forth in said patent.

The chief difficulty encountered with automatic clutches as heretofore constructed has been in the accurate starting and stopping of the mechanism to which the clutch is applied. This difficulty is particularly serious in a mechanism for cutting specified lengths of material from a web, because the measured lengths are determined by the accuracy of the starting and stopping of the cutting members.

The present invention is designed to obviate the specified difficulty and to this end consists of a clutch having a driving member which is operated continuously from any suitable source of power, a driven member fixed to the shaft of the periodically operated mechanism, and an intermediate member carrying a clutch dog capable of being automatically thrown into and out of clutching engagement with the driving member and having both positive and frictional means of engagement with the driven member. The intermediate member is preferably loosely mounted upon the shaft which carries the fixed driven member and is movable relatively to said driven member to a limited extent. The intermediate member is provided with means for positively engaging and driving the driven member in one direction and also carries a friction brake, which frictionally engages said driven member for the double purpose of partially overcoming the inertia of the driven member when the clutch is thrown into action and effectively arresting the driven member when the clutch is thrown out of action and the intermediate member is positively stopped.

In order that the invention may be fully understood it will first be described with reference to the accompanying drawings and afterwards more particularly pointed out in the annexed claims.

In said drawings:

Figure 2 is an enlarged view of part of the same showing the clutch in elevation;

Figure 3 is a vertical sectional view taken on the line 3—3 of Figure 2;

Figure 4 is an edge view of the clutch mechanism looking forwardly from the rear of the machine as represented in Figure 1;

Figure 5 is a detail view illustrating the automatic stop for the intermediate member of the clutch; and Figure 6 is a detail perspective view of the clutch dog.

Figure 1:
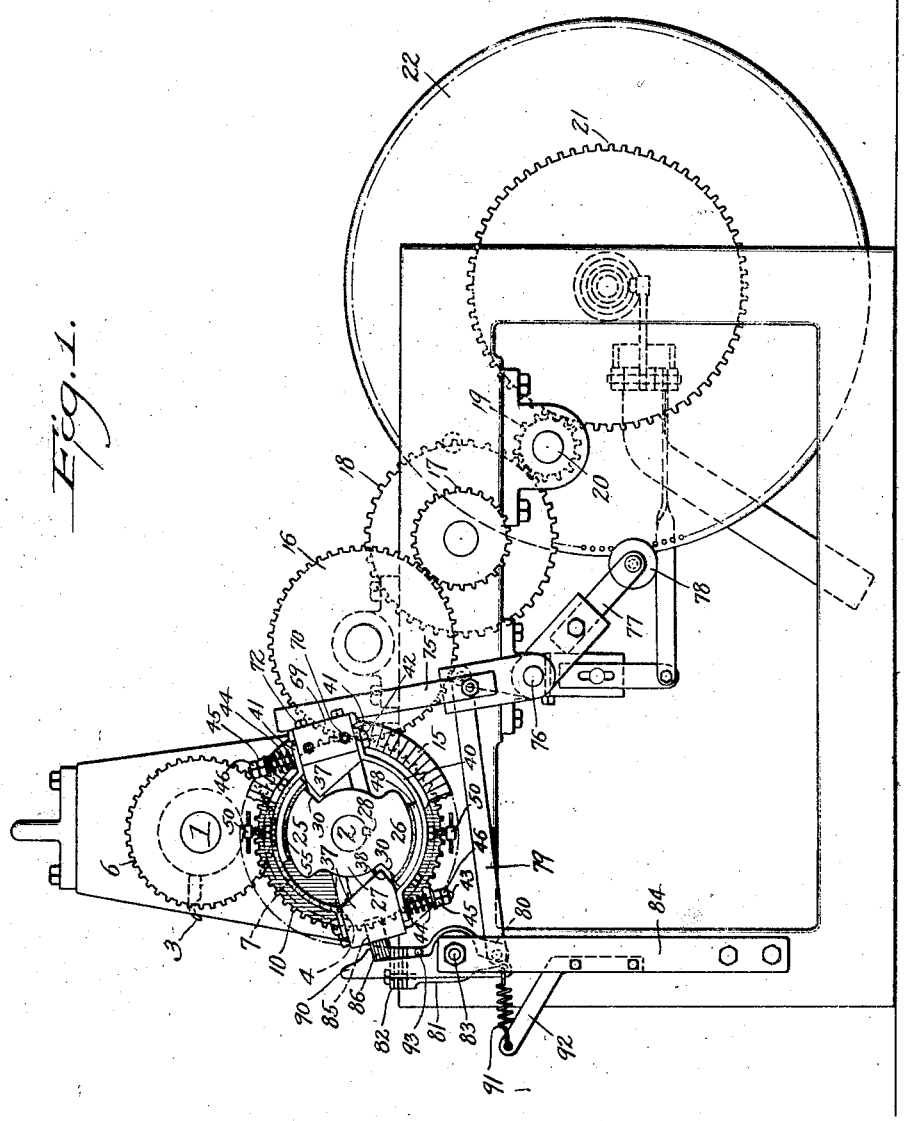
Figure 1 is a side elevation of part of a machine having my improved clutch mechanism applied thereto.

While the improved clutch may be applied to any periodically operating mechanism, I have shown it mounted directly upon one of the cutter shafts of a web cutting machine, which may be under the automatic control of the mechanism covered by my above named Patent No. 1,343,487.

1 and 2 are the heavy horizontally mounted rolls or shafts suitably journalled in a machine frame and carrying web cutting knives 3 and 4 indicated in dotted lines in Figure 1. These shafts 1 and 2 are suitably geared together at their opposite ends by means of gears such as shown at 6 and 7, so that the shafts and cutters will rotate in unison.

The lower shaft or roll 2 is extended to the left of the machine frame, as shown in Figure 4, and has freely journalled upon it a large driving gear 10 to which is secured by means of pins 11 the toothed clutch disk 15, which together with the main gear 10 constitutes the driving member of the improved clutch.

The driving gear 10 may be constantly driven by any suitable mechanism such as the train of gears 16, 17, 18 and 19, the last named of which is mounted upon a power shaft 20. This gear 19 may also mesh with a driven gear 21 carried upon the controlling pin wheel 22 of the automatic control shown in my above named patent.

Returning to the structure of the improved clutch, the driven member in the form of two diametrically opposite segmental heads 25, 26 are formed integral with a hub 27, which is keyed to the projecting end of shaft 2 by means of a key 28. In this way the driven member is positively fixed upon the shaft 2. The outer peripheries 29 of the segmental heads 25, 26 provide frictional surfaces for the engagement of two brake devices hereinafter described. Each of these segmental heads of the driven member is formed with a radial face or shoulder 30 for the purpose which will now be explained.

Interposed between the driving clutch disk 15 and driven member 25, 26, 27 is an intermediate clutch member consisting of a hub 35 freely journalled upon a bearing sleeve 36 carried by shaft 2 and having the diametrically opposite heads 37 supported from the hub 35 by heavy radial arms. These heads 37 of the intermediate member are extended parallel with axis 2 to project between the segmental heads 25, 26 of the driven member, the extended portions of heads 37 being formed with heavy radial shoulders 38 which are adapted to engage the shoulders 30 of the driven member to provide positive driving connection in one direction. It will be observed that intermediate member 35 is free to rotate to a limited extent with reference to the driven member, thereby separating the driving shoulders 30 and 38.

Heavy segmental bands or bars 40 formed with angularly bent ends 41 are mounted upon the opposite faces of heads 37 of the intermediate clutch member, so as to present the bar segments concentric with and in the same transverse plane as the segmental heads 25, 26 of the driven member. One end of each of the plates or bars 40 is rigidly secured to a head 37 by means of a screw bolt 42, while the opposite end of each plate or bar 40 guides upon a screw bolt 43 seated in one of the heads 37 and passing through an opening in an angular portion 41 of the bar or plate. A heavy spring 44 surrounds each bolt 43 and is held in engagement with the angular portion 41 by means of an adjusting nut 45 and a lock nut 46 screwed upon a bolt 43.

These segmental plates or bars 40 carry frictional brake blocks consisting of curved plates 48 mounted upon screw bolts 49 passing through bars or plates 40 into said plates 48, and are engaged adjacent to their ends by adjustable hand screw bolts 50 threaded through plates or bars 40 and engaging curved plates 48, the screws 50 being held in the desired adjusted position by means of nuts 51 mounted upon the screws and engaging the outer faces of plates or bars 40.

Each curved brake plate or block 48 carries upon its inner face one or more layers of suitable friction material 55, which is by the means described held in frictional contact with the peripheral surfaces 29 of the heads 25 and 26 of the driven member.

One of the heads 37 of the intermediate clutch member is formed in its outer edge with a squared channel 60 extending parallel with shaft 2 and slidably mounted in this channel 60 is a rectangular clutch dog or block 65, formed in one end with a series of teeth 66 which are presented radially of the shaft 2 for accurate engagement of the teeth upon the clutch disk 15 of the driving member. This clutch dog 65 has a longitudinal opening 67 bored in its outer end to receive a spring 68 which is confined in the opening 67 by means of a plate 69 secured to head 37 by screw bolts 70. 71 are cap plates which extend across the top of the head 37 and are secured by bolts 72 to confine the clutch dog 65 in its channel 60.

The clutch dog 65 is formed with a transverse groove or recess 65$^a$ for the reception of a clutch controlling lever 75 hereinafter referred to. Cap plates 71 are spaced to form a gateway 73 for the entry of the wedge shaped blade upon lever 75 into engagement with the dog 65.

The opposite head 37 of the intermediate clutch member is formed with a radial pocket indicated at 85 in which is mounted a heavy laminated stop arm 86, formed of several short blades of steel and rigidly clamped in position by screw bolts 87 passing through wall portions of the head 37 into engagement with said laminated member 86. The purpose of this top member 86 will presently appear.

The clutch controlling arm or lever 75 preferably provided with a wedge shaped dog engaging blade, not specifically shown, may be constructed and operated as fully set forth in my above named Patent No. 1,343,487. The arm 75 is adjustably mounted upon a rock shaft 76 which extends transversely of the machine and carries at its opposite end a tappet arm 77 provided with antifriction roller 78, which is presented in the path of a series of pins carried by the pin wheel 22 and automatically controlled for timing the operation of the clutch. The controlling arm 75 is connected through a link 79 with a heel 80 projecting from a rocking stop member 81 in the form of a heavy casting carrying laminated stop 82 of a series of spring plates. This stop member 81 is freely journalled upon a heavy shaft 83 projecting from the machine frame and braced at its outer end by an angular member 84 projecting up from the machine frame. It will be observed that the laminated stop 82 in the position shown in Figure 1 of the drawings is in the path of the radial laminated stop 86 carried by the intermediate clutch member as above described.

90 is a hook journalled upon the projecting end of shaft 83 alongside of the stop member 81 and adapted to engage above the laminated stop 86 for preventing the rebound of the intermediate clutch member when its forward motion is arrested. This hook 90 is held in operative relation to stop 81 by means of a spring 91 connecting the lower heel of hook 90 with a bracket arm 92, a rigid pin 93 projecting laterally from member 81 in the path of hook 90 to limit its motion under the action of said spring 91. The inner upper edge of hook 90 is beveled to permit stop arm 86 to press it backwardly out of the way when moving toward stop 82, the spring of the hook permitting this rearward motion and immediately restoring the hook to its position in engagement with the rear face of stop arm 86.

The clutch mechansm is shown in Figure 1 in its normal position of rest when the machine is not in operation. The relation of the parts in action is shown in Figure 2. When the clutch is thrown into operation by the withdrawal of controlling lever 75, either by hand or by automatic mechanism, the dog 65 is thrown into engagement with driving disk 15 at the same time that stop member 81, 82 is moved out of engagement with stop member 86. At the moment of engagement of the dog with the driving ratchet disk, the shoulders 38 of the intermediate member are slightly separated from the shoulders 30 of the driven members, so that the first shock of starting the clutch is exerted upon the intermediate member and upon the friction brakes which are in engagement with the driven member. The moment that is required to move the intermediate member into its positive engagement with the driven member, is sufficient to insure the seating of the clutch dog teeth in the teeth of the driving ratchet and avoid all danger of the dog rebounding from the driving ratchet. In this initial movement the frictional engagement between the intermediate and driven members through the friction brake tends to overcome the inertia of the mechanism to which the driven member is fixed, and while the adjustment of these friction brakes will ordinarily be such that there will be no actual movement of the driven mechanism, the arrangement is sufficient to greatly reduce the shock of the positive engagement between the intermediate member and the fixed driven member.

Immediately after the clutch is thrown into action the controlling lever is released and it and stop member 81, 82 are returned to their active positions so that upon the completion of one revolution of the clutch, the clutch dog will be disengaged from the driving ratchet and the intermediate member positively stopped by stop arm 86 coming up against stop 82. This positive stopping of the intermediate member is immediately followed by the braking action of brake members 48. With the proper adjustment of the brakes the driven mechanism will be carried by its momentum a very short space beyond the position of positive stopping of the intermediate member.

I claim:

1. The combination of a shaft, with a member fixed upon said shaft, a second member loosely mounted upon said shaft and positively engaging said first named member, and a friction brake carried by said loosely mounted member and engaging said fixed member.

2. The combination of a shaft, with a member fixed upon said shaft, a second member loosely mounted upon said shaft and positively engaging said first named member, a friction brake carried by said loosely mounted member and engaging said fixed member, and stop mechanism for said loosely mounted member.

3. The combination of a shaft, with a member fixed upon said shaft, a second member loosely mounted upon said shaft and positively engaging said first named member, means for driving said loosely mounted member, a friction brake carried by said loosely mounted member and engaging said fixed member, and means for stopping said loosely mounted member.

4. In a clutch, the combination of a driving member, with a two part driven member, a clutch dog mounted upon one part of said driven member adapted to connect with said driving member, the two parts of said driven member being relatively movable and having positive means of engagement, and a friction device connecting the two parts of said driven member.

5. In a clutch, the combination of a driving member, with a two part driven member, a clutch dog mounted upon one part of said driven member adapted to connect with said driving member, the two parts of said driven member being relatively movable and having positive means of engagement in one direction, a friction brake arranged between the two parts of said driven member, and stop mechanism for one part of said driven member.

6. In a clutch, the combination of a driving member, with a two part driven member, a clutch dog mounted upon one part of said driven member adapted to connect with said driving member, the two parts of said driven member being relatively movable and having positive means of engagement in one direction, a friction device connecting the two parts of said driven member, means controlling the operation of said clutch dog, and stop mechanism for the member part carrying said clutch dog.

7. In a clutch, the combination of a power operated driving member, a driven member, an intermediate member loosely mounted between the driving and driven members, said intermediate member positively engaging said driven member, and a friction brake carried by said intermediate member and in frictional engagement with said driven member.

8. In a clutch, the combination of a power operated driving member, a driven member, an intermediate member loosely mounted between the driving and driven members, said intermediate member positively engaging said driven member, a friction brake carried by said intermediate member and in frictional engagement with said driven member, and a stop for said intermediate member.

9. In a clutch, the combination of a power operated driving member, a driven member, an intermediate member loosely mounted between the driving and driven members, said intermediate member positively engaging said driven member, a friction brake carried by said intermediate member and in frictional engagement with said driven member, clutching means between said driving member and said intermediate member, and stop mechanism for said intermediate member.

10. In a clutch, the combination of a shaft to be periodically rotated, with a power operated driving member freely mounted upon said shaft, a driven member fixed upon said shaft, an intermediate member loosely mounted upon said shaft between the driving and driven members, said intermediate member positively engaging said driven member and movable upon said shaft with relation thereto, and a friction brake carried by said intermediate member and in frictional engagement with said driven member.

11. In a clutch, the combination of a shaft to be periodically rotated, with a power operated driving member freely mounted upon said shaft, a driven member fixed upon said shaft, an intermediate member loosely mounted upon said shaft between the driving and driven members, said intermediate member positively engaging said driven member and movable upon said shaft with relation thereto, a friction brake carried by said intermediate member and in frictional engagement with said driven member, and a stop for said intermediate member.

12. In a clutch, the combination of a shaft to be periodically rotated, with a power operated driving member freely mounted upon said shaft, a driven member fixed upon said shaft, an intermediate member loosely mounted upon said shaft between the driving and driven members, said intermediate member positively engaging said driven member and movable upon said shaft with relation thereto, a clutch between said driving member and said intermediate member, a friction brake carried by said intermediate member and in frictional engagement with said driven member, and stop mechanism for said intermediate member.

13. In a clutch, the combination of a rotary shaft, and a driving member, with a driven member fixed upon said shaft and formed with a concentric segmental portion, an intermediate member loosely mounted upon said shaft adjacent to said driven member, a clutch dog carried by said intermediate member adapted to engage said driving member, a shoulder upon said intermediate member arranged to positively engage said driven member, a segmental friction brake carried by said intermediate member and operatively engaging the segmental portion of said driven member, and a stop movable into and out of the path of said intermediate member.

14. In a clutch, the combination of a rotary shaft having a driving member loosely mounted thereon, with a driven member fixed upon said shaft and formed with concentric segmental portions, an intermediate member loosely mounted upon said shaft between said driving member and said driven member, a clutch dog carried by said intermediate member adapted to engage said driving member, shoulders upon said intermediate member arranged to positively engage said driven member, segmental friction brakes carried by said intermediate member and operatively engaging the segmental portions of said driving member, and a stop movable into and out of the path of said intermediate member.

15. In a clutch, the combination of a rotary shaft, and a driving member, with a driven member fixed upon said shaft and formed with diametrically opposite concentric segmental portions, an intermediate member loosely mounted upon said shaft adjacent to said driven member, a clutch dog carried by said intermediate member adapted to engage said driving member, means controlling said clutch dog, shoulders upon said intermediate member arranged to positively engage shoulders upon the segmental portions of said driven member, a friction brake carried by said intermediate member and operatively engaging a segmental portion of said driving member, and a stop movable into and out of the path of said intermediate member.

16. In a clutch, the combination of a rotary shaft, and a driving member, with a driven member fixed upon said shaft and formed with a concentric segmental portion, an intermediate member loosely mounted upon said shaft adjacent to said driven member and adapted to be driven by said driving member, a clutch dog carried by said intermediate member adapted to engage said driving member, a shoulder upon said intermediate member arranged to positively engage said driven member, a segmental friction brake carried by said intermediate member and operatively engaging the segmental portion of said driven member, and a stop movable into and out of the path of said intermediate member.

17. In a clutch, the combination of a driving member, a driven member, an intermediate member positively engaging said driven member, a clutch dog for connecting said driving member with said intermediate member, a dog operating member, a friction brake between said intermediate member and said driven member, a stop movable into and out of the path of said intermediate member, and means operatively connecting said dog operating member and said movable stop.

18. In a clutch, the combination of a driving member, a driven member, an intermediate member positively engaging said driven member, a clutch dog for connecting said driving member with said intermediate member, a dog operating member, a friction brake between said intermediate member and said driven member, a stop arm on said movable member, and a stop movable into and out of the path of said stop arm.

19. In a clutch, the combination of a driving member, a driven member, an intermediate member positively engaging said driven member, a clutch dog for connecting said driving member with said intermediate member, a dog operating member, a friction brake between said intermediate member and said driven member, a stop arm on said movable member, a stop movable into and out of the path of said arm, and a latch arranged to engage said stop arm to prevent it from rebounding from said movable stop.

GEORGE W. SWIFT, Jr.

Witnesses:
HOBART W. BURKEE,
JOHN HENRY BLACK, Sr.